March 24, 1953 A. COTSWORTH III 2,632,803

SIGNAL RECEIVER COUPLING NETWORK

Filed Nov. 10, 1948 2 SHEETS—SHEET 1

ALBERT COTSWORTH III
*INVENTOR.*

BY [signature]

HIS AGENT

ALBERT COTSWORTH III
*INVENTOR.*
BY [signature]
HIS AGENT

Patented Mar. 24, 1953 2,632,803

UNITED STATES PATENT OFFICE 2,632,803

SIGNAL RECEIVER COUPLING NETWORK

Albert Cotsworth, III, Oak Park, Ill., assignor to Zenith Radio Corporation, a corporation of Illinois Application November 10, 1948, Serial No. 59,395

1 Claim. (Cl. 178—44)

This invention relates to electrical coupling networks of the band pass type, and more particularly to such networks for use as interstage coupling circuits in television receivers, radio receivers and the like.

It is an object of this invention to provide an improved coupling network for use in television receivers, radio receivers and the like, which may be tuned in a simple and convenient manner to provide desired operating characteristics.

Another object of this invention is to provide such an improved network which may be tuned in this simple manner to a selected resonant frequency and to produce a desired band-pass characteristic at this frequency.

A further object of this invention is to provide such improved coupling networks having variable components to provide adjustable band-pass characteristics, certain of such variable components being connected in a manner to permit convenient mounting thereof without affecting the operation of the network.

Figure 2:
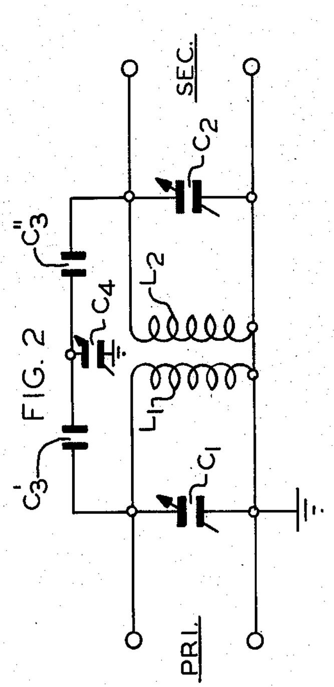
Figure 4:
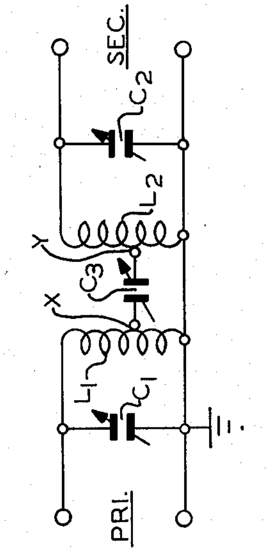
Figure 3:
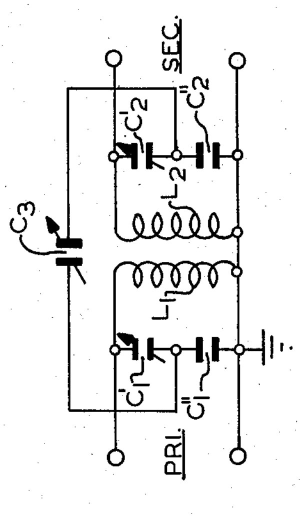
Figure 1:
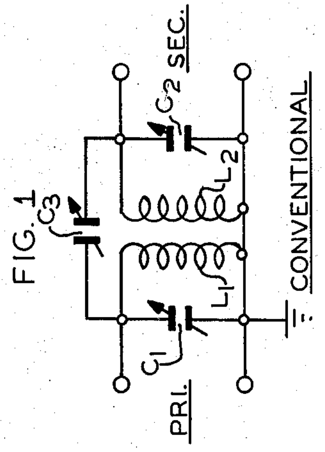
Figure 5:
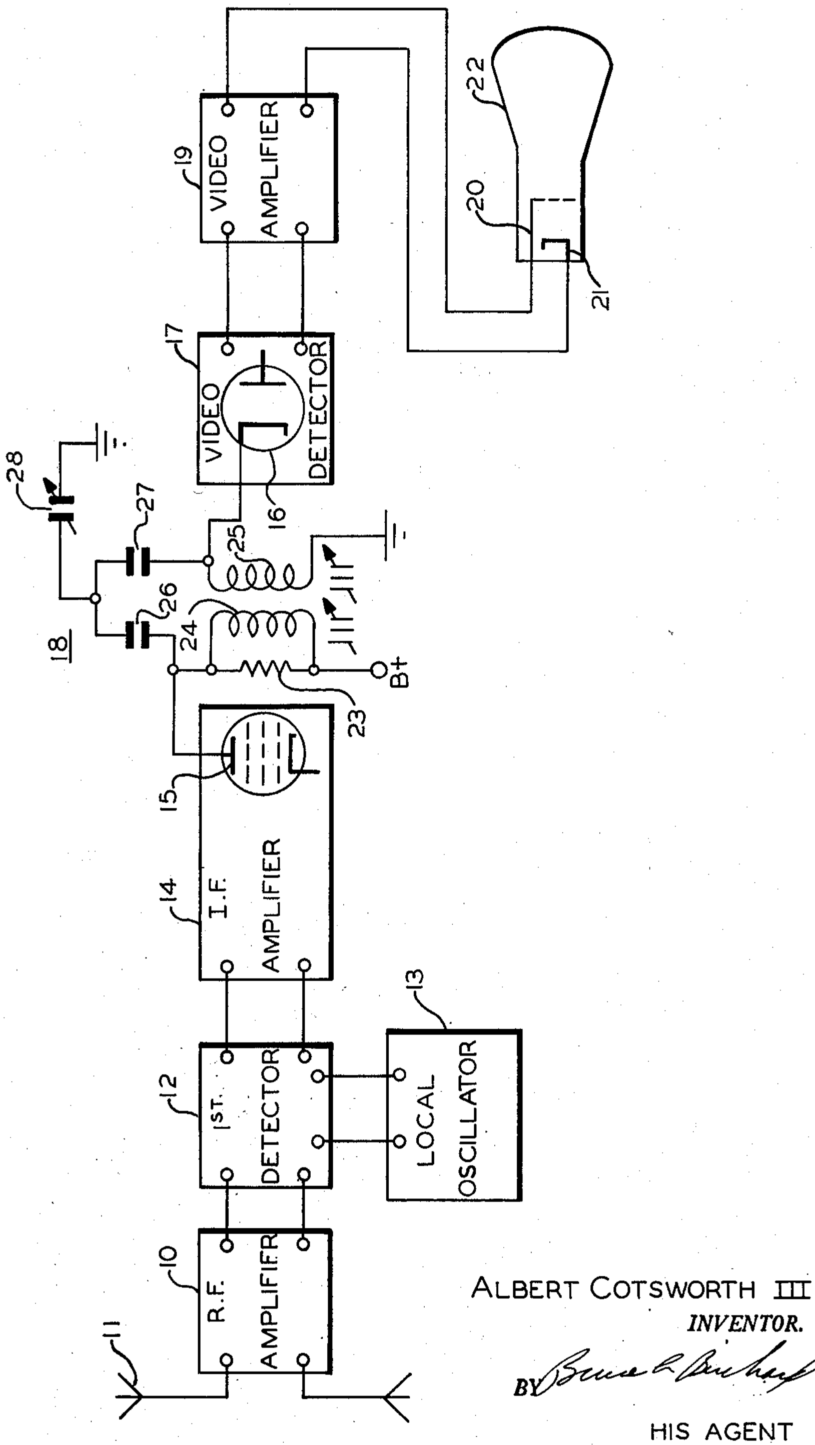

The features of this invention which are believed to be new are set forth with particularity in the appended claim. The invention itself, however, together with further objects and advantages thereof may best be understood by reference to the following description when taken in conjunction with the accompanying drawings, in which:

Figure 1 shows a diagram of a conventional coupling network, which diagram is useful in the understanding of the invention, Figures 2, 3, and 4 show diagrams of coupling networks representing embodiments of the present invention, and Figure 5 shows a television receiver incorporating a coupling network essentially the same as that of Figure 2.

Figure 1 shows an interstage coupling network conventionally used in radio receivers, television receivers and the like, wherein it is desired to couple one stage to another, and to provide some measure of adjustment of the coupling between the input and output circuits of the network. This network includes an input circuit consisting of an inductor $L_1$ shunted by an adjustable capacitor $C_1$, and an output circuit consisting of an inductor $L_2$, inductively coupled to the inductor $L_1$, and shunted by an adjustable capacitor $C_2$; these circuits additionally being capacitively coupled by means of an adjustable capacitor $C_3$. One common use for this network is to provide coupling between the intermediate-frequency stages of a superheterodyne receiver, and when used for such a purpose the input and output circuits of the network are tuned to the intermediate frequency selected for the receiver, and the capacitive coupling between the circuits is adjusted to provide the required band-pass characteristic. To tune the network to the desired operating characteristics, the input circuit $C_1L_1$ is tuned to the intermediate frequency and the output circuit $C_2L_2$ is also tuned to this frequency. The capacitor $C_3$ is then adjusted to provide the required degree of coupling for the proper band-pass characteristic of the network. However, capacitor $C_3$, apart from capacitively coupling the input circuit $C_1L_1$ to the output circuit $C_2L_2$, effectively adds capacity in shunt with each of these circuits. Therefore, when capacitor $C_3$ is adjusted to provide the required band-pass characteristic, the input and output circuits are detuned by such adjustment and resonate at frequencies other than the desired intermediate frequency. Hence, the input and output circuits must again be tuned to the intermediate frequency. When the inductance to capacitance ratio of these circuits is different, as is frequently the case in such coupling networks, especially in high frequency receivers where $C_1$ is usually the combination of the output capacity of the discharge device in the preceding intermediate frequency stage plus stray capacities of the circuit, and $C_2$ is usually the combination of the input capacity of the device in the following stage plus stray capacities, the amount of the detuning in the input circuit due to the coupling adjustment is different from the amount of detuning of the output circuit. Furthermore, when the quality factor (Q) of the input circuit is different from that of the output circuit which is likewise usually the case, the differing amounts of detuning in these circuits due to the coupling adjustment causes asymmetry in the frequency response of the network. Therefore, it is impossible to determine whether the first coupling adjustment has been made correctly, until the input and output circuits have been re-tuned to the intermediate frequency. Hence, final adjustment of the network to the desired operating characteristics is realized by a cumbersome trial and error method. When the quality factors of the input and output circuits are equal, the adjustment of capacitor $C_3$, with the resulting differing amounts of detuning of these circuits, does not cause asymmetry in the frequency response of the network, but such detuning causes the overall response of the network to decrease and the apparent coupling to increase. Therefore, the trial and error method must again be used to tune the network to the desired operating characteristics.

The present invention is directed to coupling networks that may be used for the above described purposes. These proposed networks include a tuned input circuit and a tuned output circuit, inductively and capacitively coupled one to the other. These networks are so designed that when the capacitive coupling is adjusted to alter the band-pass characteristic thereof, an equal amount of detuning is introduced into the input and output circuits and the frequency response characteristic of the network is unaffected by such adjustment. The first adjustment of the capacitive coupling of the network in the proposed networks produces the desired band-pass characteristic, and the network may conveniently be tuned to the desired operating characteristics, without resorting to the involved method of trial and error.

In the network of Figure 2, the input circuit is formed by the inductance coil $L_1$ shunted by the adjustable capacitor $C_1$, and the output circuit is formed by the inductance coil $L_2$ shunted by the adjustable capacitor $C_2$, the coils $L_1$ and $L_2$ being inductively coupled one to the other. The capacitor $C_3$, which capacitively couples the input circuit to the output circuit of the network of Figure 1, is replaced in the network of Figure 2, by two series-connected capacitors $C_3'$ and $C_3''$. The common junction of these series capacitors is coupled through an adjustable capacitor $C_4$ to a point of reference potential. Capacitors $C_3'$ and $C_3''$ are so chosen that substantially the following proportion exists:

$$C_3'':C_2::C_3':C_1$$

Where this relation is established, the shunting effect of the capacitive coupling on the input circuit and on the output circuit respectively is so proportioned that for all practical purposes, variation of the capacitor $C_4$ which varies the capacitive coupling between the circuits, causes each circuit to be detuned by such variation to the same extent and, hence, does not alter the frequency response of the network. Therefore, to tune the network of Figure 2 to the desired operating conditions, it is merely necessary, firstly to tune the input and output circuits to resonate at the intermediate frequency, secondly to tune $C_4$ to produce the desired band-pass characteristic of the network, and thirdly, if necessary, to re-tune the input and output circuits slightly to obtain precisely the required characteristics of the network. It is noted that one side of the adjustable capacitor $C_4$ is connected to ground which greatly facilitates the mounting of this capacitor.

In the embodiment of Figure 3, the capacitor $C_1$, which shunted the inductance coil $L_1$ in Figures 1 and 2, is replaced by series-connected capacitors $C_1'$ and $C_1''$ and capacitor $C_2$ of Figures 1 and 2 is replaced by series-connected capacitors $C_2'$ and $C_2''$. The adjustable coupling capacitor $C_3$ is connected between the common junction of capacitors $C_1'$, and $C_1''$, and the common junction of capacitors $C_2'$, $C_2''$. The capacitors $C_1''$ is made substantially equal to capacitor $C_2''$. The effective capacitance shunting the primary circuit due to capacitor $C_3$ is now between the common junction of capacitors $C_1'$, $C_1''$ and ground, and the effective capacitance shunting the secondary circuit due to capacitor $C_3$ is between the common junction of capacitors $C_2'$, $C_2''$ and ground. Since $C_1''=C_2''$ this effective capacitance is such that variation of capacitor $C_3$ detunes the input and output circuits substantially to an equal extent. Therefore, as in the case of the network of Figure 2, tuning of the present network is greatly simplified.

Another embodiment of the invention, shown in Figure 4, is similar to the conventional network of Figure 1 with the exception that the coupling capacitor $C_3$ is connected between taps X and Y on the inductance coils $L_1$ and $L_2$ respectively. The taps are so chosen that the inductance of the portion of coil $L_1$ between the tap X and ground is equal to the inductance of the portion of coil $L_2$ between the tap Y and ground. Hence, again the effective shunting capacitance introduced by capacitor $C_3$ into the input and output circuits is such that variation of this capacitor to produce the required coupling between these circuits detunes both circuits substantially to an equal extent.

Figure 5 shows one embodiment of the invention incorporated in the circuits of a television receiver. In this receiver a network constructed in accordance with this invention is used to couple the final intermediate frequency stage to the video detector stage. The receiver of Figure 5 comprises the usual radio-frequency amplifier 10 of one or more stages, which may be coupled to a suitable antenna 11. The radio-frequency amplifier is connected to a first detector 12, which in turn is coupled to a heterodyning oscillator 13, and an intermediate-frequency amplifier 14 of one or more stages. The discharge device 15 of the final stage of the intermediate-frequency amplifier 14 is coupled to the discharge device 16 of a video detector 17 through a coupling network 18 embodying the present invention. The detector 17 is connected to a video amplifier 19, and this amplifier is in turn coupled between the control electrode 20 and cathode 21 of an image reproducing device 22.

In this system, television signals received by antenna 11 are amplified in radio-frequency amplifier 10, and the amplified signals are impressed on first detector stage 12. In stage 12 these signals are heterodyned by heterodyning signals from the heterodyning oscillator 13 to produce the desired intermediate-frequency signal. The intermediate-frequency signal is amplified in the amplifier 14, and the amplified signal is impressed on the video detector 17 through the coupling network 18. Network 18 is tuned to the video channel intermediate frequency of the receiver and is adjusted to pass solely the video intermediate-frequency signal. Video signals from detector 17 are amplified in video amplifier 19 and impressed between control electrode 20 and cathode 21, to control the intensity of the cathode ray in reproducing device 22, in the usual manner. The sound, synchronizing and scanning sections of the television receiver need form no part of the present invention, and are therefore not shown.

The anode of device 15 is connected to the positive terminal B+ of a source of unidirectional potential, not shown, through resistor 23 and inductance coil 24 which are connected in shunt to each other. The inductance coil 24 is inductively coupled to coil 25, one extremity of the latter coil being connected to the cathode of device 16 and the other extremity being connected to ground or the chassis of the receiver. The coils 24 and 25 are capacitively coupled to each other through series-connected capacitors 26 and 27 connected between the high potential sides of these coils. The common junction of capacitors 26 and 27 is connected to a point at ground potential through an adjustable capacitor 28. The coils 24 and 25 are shown to be variable and, in combination with the distributed capacity in the respective circuits, constitute respectively the input and output circuits of the network.

In the receiver of Figure 5, the input and output circuits of the network 18 are tuned to the intermediate frequency, and the frequency response characteristic of this network is adjusted so that only the band containing the video information is passed. This network may be tuned to the required operating characteristics by tuning the input and output circuits to the intermediate fequency, adjusting capacitor 28 to provide the required band-pass characteristic, and if necessary, re-tuning the input and output circuits slightly to resonate precisely at the intermediate frequency. Therefore, tuning of the network is accomplished in at most three operations, as opposed to the multitude of adjustments required to tune properly the usual coupling networks as are used in present day receivers.

The coupling networks of Figures 2, 3 and 4 use coupling elements having a capacitive value greater than in conventional networks of this type. This fact is advantageous, in that relatively large capacitors having a certain percentage tolerance are less expensive than small capacitors having the same percentage tolerance.

This invention provides therefore improved coupling networks, the response of which may be conveniently varied to produce desired band-pass characteristics without introducing unbalance between the input and output circuits associated therewith, whereby tuning of the networks to produce these desired characteristics is greatly facilitated.

This invention further provides improved coupling networks in which the variable components that adjust the band-pass characteristics have a terminal at or near ground potential, hence permitting these components to be mounted in a convenient manner.

While particular embodiments of the invention have been shown and described, modifications may be made. It is intended in the appended claim to cover all such modifications as fall within the true spirit and scope of the invention.

I claim:

A coupling network including, a tuned input circuit having a capacitive value ($C_1$) and a tuned output circuit having a capacitive value ($C_2$), said circuits being inductively coupled one to the other and individually having one terminal connected to a point of reference potential, a pair of series-connected capacitive elements having respective capacitive values ($C_3'$) and ($C_3''$) capacitively coupling said input circuit to said output circuit, and adjustable capacitive element connected between the common junction of said series-connected elements and said point of reference potential for varying the capacitive coupling between said circuits, said series-connected elements having predetermined reactive values to obtain substantially the following proportion $C_3'':C_2::C_3':C_1$.

ALBERT COTSWORTH, III.

REFERENCES CITED

The following references are of record in the file of this patent:

UNITED STATES PATENTS

| Number | Name | Date |
|---|---|---|
| 1,928,720 | Edwards | Oct. 3, 1933 |
| 2,045,910 | Harnett | June 30, 1936 |
| 2,088,229 | Braden | July 27, 1937 |
| 2,152,823 | Schlesinger | Apr. 4, 1939 |
| 2,205,075 | Wilhelm | June 18, 1940 |
| 2,282,113 | Brailsford | May 5, 1942 |